United States Patent
Lin et al.

(10) Patent No.: US 9,531,815 B2
(45) Date of Patent: *Dec. 27, 2016

(54) RELEVANT COMMUNICATION MODE SELECTION

(71) Applicant: Microsoft Technology Licensing, LLC, Redmond, WA (US)

(72) Inventors: Eugene Lin, Seattle, WA (US); Neal Myerson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,531

(22) Filed: Jun. 22, 2015

(65) Prior Publication Data

US 2016/0142495 A1  May 19, 2016

Related U.S. Application Data

(63) Continuation of application No. 14/543,874, filed on Nov. 17, 2014, now Pat. No. 9,094,363.

(51) Int. Cl.
*G06F 15/16* (2006.01)
*H04L 29/08* (2006.01)
(Continued)

(52) U.S. Cl.
CPC .......... *H04L 67/141* (2013.01); *G06F 3/0482* (2013.01); *G06F 3/04842* (2013.01); *H04L 51/36* (2013.01); *H04L 69/24* (2013.01)

(58) Field of Classification Search
None
See application file for complete search history.

(56) References Cited

U.S. PATENT DOCUMENTS 7,706,785 B2  4/2010  Lei et al.
8,194,831 B2  6/2012  Hepworth et al.
(Continued)

FOREIGN PATENT DOCUMENTS

CN   101151878 A   3/2008
EP   2741425 A2   6/2014
FR   2878117 A1   5/2006

OTHER PUBLICATIONS

"EcENACT extends your business to wherever your employees, partners and employees may be", Retrieved on Feb. 2, 2015. Available at: http://www.ecdsllc.com/ecenact.html.
(Continued)

*Primary Examiner* — Brian P Whipple
(74) *Attorney, Agent, or Firm* — Julia F. Akhter; Alpana Tiwari; Micky Minhas

(57) ABSTRACT

When initiating a communication session, a user may be faced with the challenge of deciding which communication mode to use to contact and/or share content with one or more other users intended for participation in the communication session. A communication application may be configured to provide a relevant communication mode selection, the communication application including selection and communication modules. For example, the selection module of the communication application may determine available communication modes in response to detection of a request to initiate a communication session from within an application or from a user experience provided by the communication application. The selection module may remove one or more unused communication modes, and prioritize the remaining available communication modes to select a communication mode. A communication module of the communication application may then automatically initiate the communication session through the selected communication mode.

20 Claims, 11 Drawing Sheets

(51) Int. Cl.
    *H04L 12/58*     (2006.01)
    *H04L 29/06*     (2006.01)
    *G06F 3/0482*     (2013.01)
    *G06F 3/0484*     (2013.01)

(56) References Cited

U.S. PATENT DOCUMENTS

| | | |
|---|---|---|
| 8,223,940 B2 | 7/2012 | O'Shaughnessy et al. |
| 8,630,682 B2 | 1/2014 | Garcia |
| 8,769,032 B2 | 7/2014 | Ginevan et al. |
| 8,793,617 B2 | 7/2014 | Xu et al. |
| 2002/0191639 A1 | 12/2002 | Norby |
| 2005/0064883 A1 | 3/2005 | Heck et al. |
| 2007/0116194 A1 | 5/2007 | Agapi et al. |
| 2009/0170480 A1 | 7/2009 | Lee |
| 2009/0274286 A1 | 11/2009 | O'Shaughnessy et al. |
| 2012/0096095 A1 | 4/2012 | Bhargava |
| 2012/0296975 A1 | 11/2012 | Ghorbel et al. |
| 2013/0080954 A1 | 3/2013 | Carlhian et al. |
| 2013/0191475 A1 | 7/2013 | Partovi |
| 2014/0074952 A1 | 3/2014 | White et al. |
| 2014/0136208 A1 | 5/2014 | Maltseff et al. |

OTHER PUBLICATIONS

"International Search Report and Written Opinion Issued in PCT Application No. PCT/US2015/060239", Mailed Date: Feb. 19, 2016, 12 pages.

RELEVANT COMMUNICATION MODE SELECTION

BACKGROUND

When initiating a communication session, a user may be faced with the challenge of deciding which communication mode to use to contact one or more other users intended for participation in the communication session. For example, in a typical work environment, the user may have a choice of using email, social networking, instant messaging, or text messaging to contact the other users. Existing solutions may offer the user a choice of communication modes in a list, however these solutions involve performance of an additional user selection step, and often present communication modes that are unlikely to be selected.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic selection of a communication mode. An example method to provide a relevant communication mode selection may include determining available communication modes in response to detecting a request to initiate a communication session, removing one or more unused communication modes, prioritizing remaining available communication modes to select a communication mode, and automatically initiating the communication session through the selected communication mode.

These and other features and advantages will be apparent from a reading of the following detailed description and a review of the associated drawings. It is to be understood that both the foregoing general description and the following detailed description are explanatory and do not restrict aspects as claimed.

GLOSSARY

Figure 1:
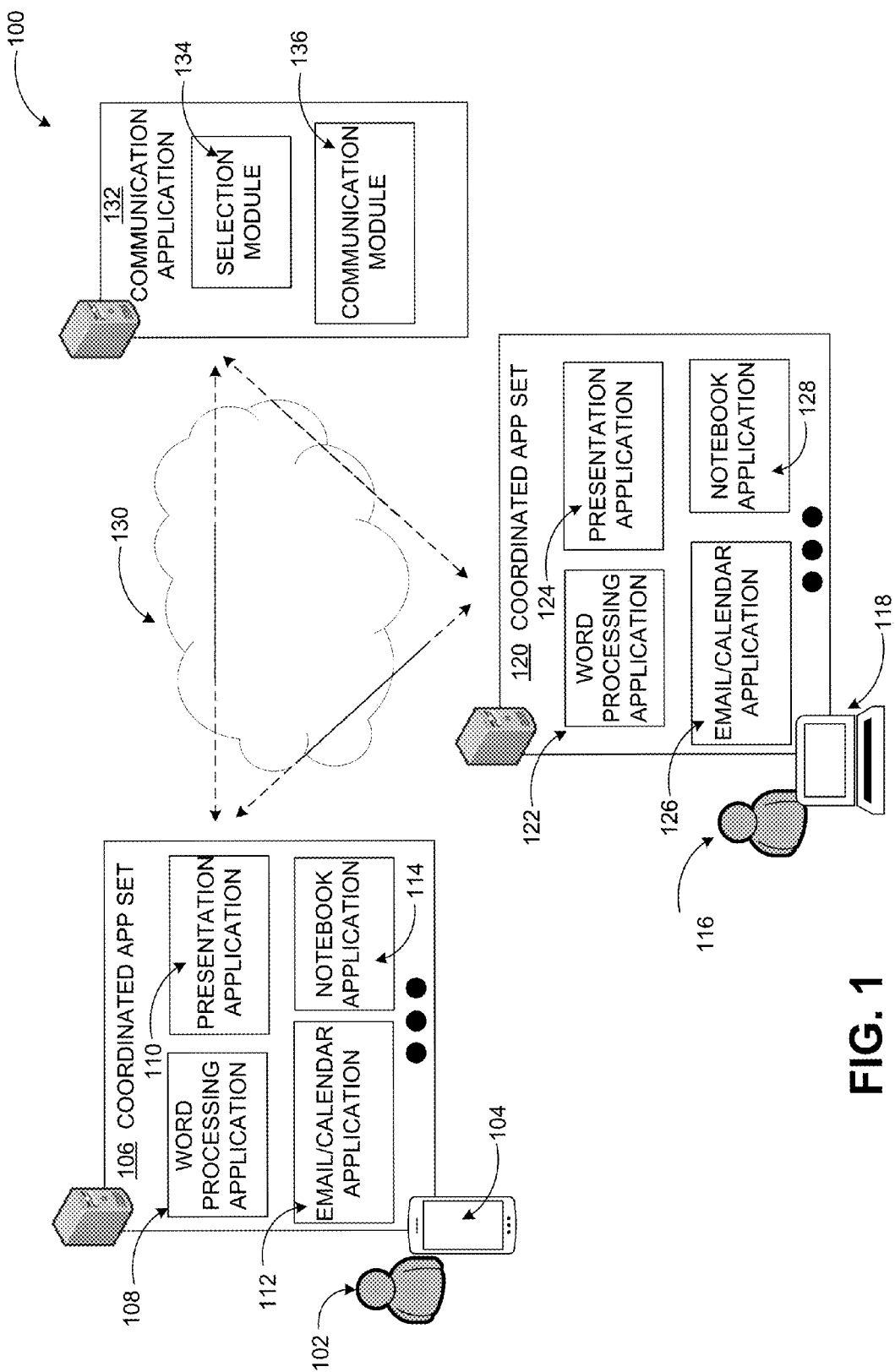
FIG. 1 includes a conceptual diagram illustrating an example networked configuration environment, where a communication application may be a third-party service.

Communication mode—a communication method or channel through which an initiating user communicates with one or more target users that includes voice communication, audio communication, video communication, email messaging, text messaging, instant messaging, application sharing, or data sharing through wired and/or wireless means.

Available communication mode—a communication method or channel through which an initiating user communicates with one or more target users determined based on one or both of the initiating and the target users and the network over which the initiating and the target users are communicating.

Communication session—a period of communication between an initiating user and one or more target users initiated through a selected communication mode.

Unused communication mode—a communication mode that has not been used or has not been used recently by one or both of an initiating user and a target user.

Remaining communication modes—one or more available communication modes that have been used at least once by one or both of an initiating user and a target user.

Initiating user—a user who requests to initiate a communication session.

Target user—a user with whom an initiating user requests to initiate a communication session.

Subscription account—an account with a service to which one or both of an initiating user and a target user subscribe for communicating over one or more communication modes.

Frequent use of communication mode—a particular communication mode is considered as used frequently when a ratio of a number of communication sessions initiated using the particular communication mode to a total number of communication sessions initiated using the particular communication mode is above a predefined threshold.

Availability status—a presence status associated with one or both of an initiating user and a target user indicating an availability of the initiating user or the target user that includes available, busy, away, out of office, or in a meeting.

Client device—a computing device associated with one or both of an initiating user and a target user that includes a desktop computer, a laptop computer, a tablet computer, a smart phone, a vehicle mount computer, or a wearable computer.

Device capabilities—one or more communication or presentation capabilities of a client device associated with one or both of an initiating user and a target user that include one of voice communication, audio communication, video communication, email messaging, text messaging, instant messaging, application sharing, or data sharing.

Memory—a component of a computing device configured to store one or more instructions to be executed by one or more processors.

File—any form of structured data that is associated with audio, video, graphics, images, and text.

Content—any form of structured data and streaming data that is associated with audio, video, graphics, images, and text.

Confidence level—a percentage of confidence that remaining communication modes are prioritized accurately based on a ratio of priority criteria that correspond to a highest prioritized communication mode.

First threshold—a predefined percentage of confidence that determines whether a highest prioritized communication mode is automatically selected as the selected mode.

Second threshold—a predefined percentage of confidence that determines whether a highest prioritized communication mode is automatically selected as the selected mode with an option provided to an initiating user to change the communication or whether a list of prioritized communication modes are presented to the initiating user for selection of the communication mode.

First server—a server of a system configured to provide access to an application to a plurality of users.

Application—a program that when executed enables a user to communicate, create, edit, and share content.

Second server—a server of a system configured to execute a communication application.

Communication application—a service, including a selection module and a communication module, configured to provide a relevant communication mode selection that is one of a third party service, an integrated module of a coordinated application set, or an integrated module of an application.

User experience—a visual display associated with an application or service through which a user interacts with the application or service.

Application programming interface (API)—a set of routines, protocols, and tools for an application or service that enable the application or service to interact or communicate with one or more other applications and services managed by separate entities.

Integrated module—a component of an application or service that is integrated within the application or service such that the application or service is configured to execute the component.

Coordinated application set—a service to which a user subscribes to access one or more applications that when executed enable a user to communicate, view, create, edit, analyze, and share content.

Wireless communication—a communication medium to facilitate a communication session through a selected communication mode between two or more devices in the absence of a physical connection through an electrically or optically conductive medium.

Wired communication—a communication medium to facilitate a communication session through a selected communication mode between two or more devices with a physical connection through an electrically or optically conductive medium.

Selection module—a module of a communication application configured to determine available communication modes, remove unused communication modes, and prioritize remaining available communication modes to select a communication mode.

Removal criteria—one or more criteria to identify an unused communication for removal that include lack of a subscription by one or both of an initiating user and a target user to a service that provides a communication mode, and lack of login or lack of recent login to a subscription account using the communication mode by one or both of the initiating user and the target user.

Priority criteria—one or more criteria to prioritize remaining available communication modes to select a communication mode that include frequent use of the communication mode by one or both of an initiating user and a target user, definition of the communication mode as the selected communication mode by one or both of the initiating user and the target user, an availability status of one or both of the initiating user and the target user, current use of the communication mode by one or both of the initiating user and the target user, capabilities of a device currently being used by one or both of the initiating user and the target user, and a type of content to be shared between the initiating user and the target user.

Communication module—a module of a communication application configured to initiate a communication session through a selected communication mode.

Third party service—an independent service separate from a system used by the initiating user and the target user, another service, or an application.

Integrated module—a component of an application or service that is integrated within the application or service such that the application or service is configured to execute the component.

Computer-readable memory device—a computer-readable storage medium implemented via one or more of a volatile computer memory, a non-volatile memory, a hard drive, a flash drive, a floppy disk, or a compact disk, and comparable hardware media that includes instructions thereon to select a communication mode.

User action—an interaction between a user and a user experience of an application or a user experience provided by a communication application that includes one of touch input, gesture input, voice command, eye tracking, gyroscopic input, pen input, mouse input, and keyboards input.

DETAILED DESCRIPTION

As briefly described above, a communication application, including a selection module and a communication module, may be configured to provide a relevant communication mode selection. For example, the selection module may determine available communication modes in response to detection of a request from an initiating user to initiate a communication session with a target user. The selection module may remove one or more communication modes that may not be used by one or both of the initiating and target users based on one or more removal criteria, and prioritize the remaining available communication modes to select a communication mode based one or more priority criteria. In some embodiments, a confidence level in the prioritization of the remaining available communication modes may be determined. The communication module may then automatically initiate the communication session through the selected communication mode.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for relevant communication mode selection. Examples of platforms include, but are not limited to, a hosted service executed over a plurality of servers, an application executed on a highest prioritized computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example networked configuration environment, where a communication application may be a third-party service, according to embodiments. As shown in diagram 100, one or more users (e.g., 102, 116) may subscribe to a coordinated application set (e.g., 106, 120). The coordinated application set may provide the users access to one or more applications such as an email/calendar application 112, 126, a word-processing application 108,122, a spreadsheet application, a notebook application 114,128, or a presentation application 110,124 that upon execution may enable the users to communicate, create, edit, and share content. For example, a first user 102 may execute the word-processing application 108 on a first client device 104, such as a smart phone, and/or a second user 116 may execute the word-processing application 122 on a second client device 118, such as a laptop, respectively. Other client devices may include a desktop computer, a tablet, and a wearable, for example. The first user 102 and the second user 116 may communicate and/or share the content with one another over a network such as a cloud 130 through one or more available communication modes. The available communication modes may include voice communication, audio communication, video communication, email messaging, text messaging, instant messaging, application sharing, and/or data sharing, for example. Additionally, the first user 102 and/or the second user 116 may subscribe to a communication application 132 over a same network, such as the cloud 130, or over a different network, for example. The communication application 132 may be a third party service that includes a selection module 134 and a communication module 136.

In an example embodiment, the first user 102, an initiating user, may request to initiate a communication session with the second user 116, a target user, through the word-processing application 108. For example, the first user 102 may request to share a document from the word-processing application 108 with the second user 116. The selection module 134 of the communication application 132 may be configured to detect the request to initiate the communication session from within the word-processing application 108, and determine available communication modes. The available communication modes may be determined based on the first user 102 and/or the second user 116 and/or based on the network over which the first user 102 and/or the second user 116 are communicating. In other examples, the first user 102 may request to initiate a communication session with the second user 116 through a user experience provided by the communication application 132.

The selection module 134 may be configured to remove unused communication modes. An unused communication mode may be identified for removal by determining whether the first user 102 and the second user 116 have subscribed to a service that provides the communication mode, and whether the first user 102 and the second user 116 have logged into a subscription account using the communication mode ever and/or recently. Accordingly, if the first user 102 or the second user 116 have not subscribed to a service or logged into a subscription account using the communication mode ever and/or recently, the communication mode may be removed. For example, if the first user 102 and/or the second user 116 have not subscribed to a service or logged into a subscription account using a video communication mode, the video communication mode may be removed.

The selection module 134 may then be configured to prioritize remaining available communication modes to select a communication mode, where the selected communication mode may be email messaging, for example. In some embodiments, a communication mode may be prioritized if the communication mode is used frequently by one or both of the first user 102 and the second user 116 and/or is used frequently by the first user 102 when communicating with the second user 116. Frequent use of a communication mode may be defined herein as when a ratio of a number of communication sessions initiated using the communication mode to a total number of communication sessions initiated is above a predefined ratio. For example, the first user 102 may frequently use an email messaging communication mode if the first user uses the email messaging communication mode at least 7 out of 10 communication sessions. In other embodiments, a communication mode may be prioritized if the communication mode has been explicitly defined as a selected communication mode by one or both of the first user 102 and the second user 116. For example, the second user 116 may explicitly define email messaging as a selected communication mode.

Furthermore, determination of priority may be determined using the ratio of the number of communication sessions of one mode versus the number of communication sessions of another mode. For example, the first user 102 may initiate a large absolute number of communication sessions via a text messaging mode, but the number may still be small compared with an even larger number of communication sessions initiated via an email messaging mode. This comparison may also be determined by giving more weight in the ratio to more recent communications. For example, the first user 102 may initiate an equal number of communication sessions in text messaging and email messaging modes, but may not have used the text messaging mode as recently.

In some examples, a communication mode may be prioritized based on one or more of a location and an availability status of one or both of the first user 102 and the second user 116. For example, if a location and availability status of the second user 116 indicates the second user 116 is out of the office and unavailable, the communication mode prioritized may include email messaging. Alternatively, if a location and availability status of the second user 116 indicates the second user 116 is at a worksite and available, the communication mode prioritized may include instant messaging or voice communication. In another example, the prioritization based on the location and the availability status may reflect whether it is convenient for the recipient to communicate in a given mode. For example, if the location of the second user 116 is determined to be in a moving car, voice communication may be prioritized.

In other examples, a communication mode may be prioritized that one or both of the first user 102 and the second user 116 are currently using and/or based on capabilities of a current device used by one or both of the first user 102 and the second user 116. For example, the first user 102 and the second user 116 may be using a laptop, and may be currently using email messaging. Accordingly, email messaging may be prioritized. Capabilities of a device may include one or more communication or presentation capabilities of that include one of voice communication, audio communication, video communication, email messaging, text messaging, instant messaging, application sharing, or data sharing. For example, a smart phone may be capable of voice/audio/video communication, email messaging, and text messaging, but may not have instant messaging capabilities.

In some embodiments, a confidence level in the prioritization of the remaining available communication modes may be determined, where the confidence level may be a percentage of confidence that the prioritization is accurate based on a ratio of priority criteria that correspond to a highest prioritized communication mode. The priority criteria may include frequent use of the communication mode by the first user 102 and/or the second user 116, and definition of the communication mode as the selected communication mode by the first user 102 and/or the second user 116. The priority criteria may also include a location and availability status of the first user 102 and/or the second user 116, current use of the communication mode by the first user 102 and/or the second user 116, and capabilities of a device currently being used by the first user 102 and/or the second user 116, as described in detail above. For example, if the highest prioritized communication mode of the remaining available communication modes is an email messaging communication mode, and 8 out of 10 priority criteria are determined to correspond to the email messaging communication mode, a confidence level of 80% may be determined.

In some examples, there may be a first threshold and a second threshold of the confidence level that may determine selection of the communication mode. For example, a first threshold may be 75% confidence in prioritization of the remaining available communication modes, and a second threshold may be 50% confidence in prioritization of the remaining available communication modes. In response to a determination that the confidence level is above the first threshold, the highest prioritized communication mode may be automatically selected as the selected communication mode. Accordingly, in the example scenario above, the 80% confidence level is above the first threshold (75% confidence level) and thus the email messaging communication mode may be automatically selected as the selected mode. In response to a determination that the confidence level is below the first threshold and above the second threshold, the highest prioritized communication mode may be automatically selected with an option provided to the first user 102 and/or second user 116 to change the selected communication mode. In response to a determination that the confidence level is below the second threshold, a list of the prioritized communication modes may be presented to the first user 102 and/or second user 116 for explicit selection of the communication mode.

In other embodiments, the determination of how the communication mode is selected may be based on previous selections the first user 102 and/or second user 116 has made in response to presentation of options to select. For example, if the second user 116 has selected "email" as the communication mode in 50 of the last 50 times the second user 116 has been presented with an option to select a communication mode, email may be automatically selected next time it appears as a high priority choice instead of presenting the second user 116 an option and/or a list of modes for selection. Additionally, the second user 116 may be enabled to select how future communication mode options are presented. For example, when a list of the prioritized communication modes is presented, the second user 116 may also be provided with a mechanism to opt-out of future options and request that the communication application 132 automatically select the highest priority mode in future communication sessions.

Furthermore, the communication mode may be selected based on a type of content to be shared between the first user 102 and the second user 116. For example, if the document from the word-processing application that the first user 102 is sharing with the second user 116 is a large document comprising images, graphics, charts and/or tables, email messaging may be selected as the communication mode because the document may be too large to share via text messaging or instant messaging communication modes. The communication module 136 of the communication mode may then be configured to initiate the communication session between the first user 102 and the second user 116 through the selected communication mode.

Existing solutions for selection of communication modes may offer the initiating user a choice of communication modes in a list, however these solutions involve performance of an additional user selection step, and often present communication modes that are unlikely to be selected. Automatic selection of a communication mode, as described in the embodiments above, may advantageously eliminate unlikely communication modes by removing the unused communication modes by one or both of the initiating user and target user. Furthermore, automatic selection of the communication mode may advantageously anticipate future communication modes used between the initiating user and target user by prioritizing the remaining available communication modes.

Figure 2:
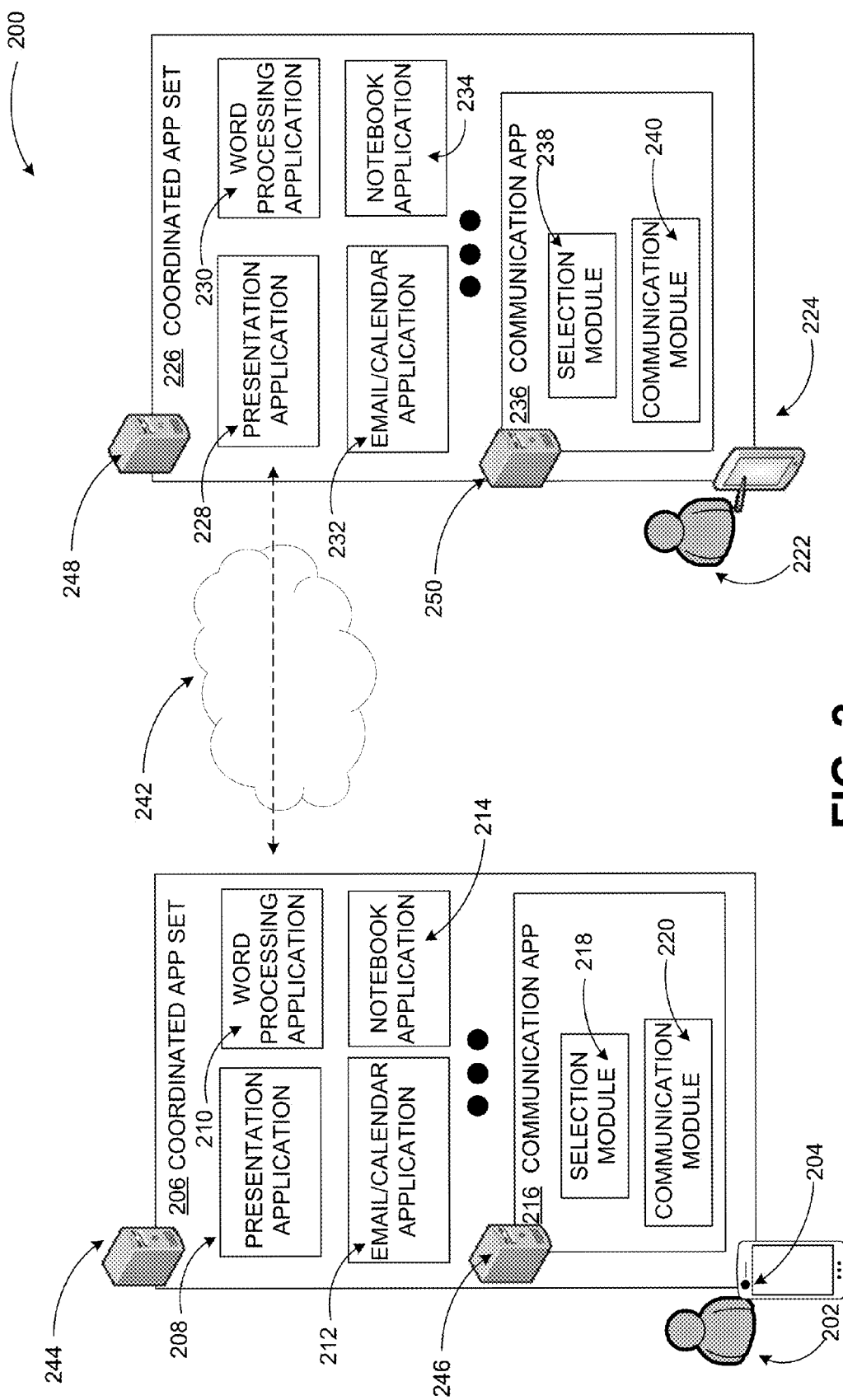
FIG. 2 illustrates a conceptual diagram illustrating an example networked configuration environment, where a communication application within a coordinated application set may service applications within the same coordinated application set.

FIG. 2 illustrates a conceptual diagram illustrating an example networked configuration environment, where a communication application within a coordinated application set may service applications within the same coordinated application set. One or more users (e.g., 202, 222) may subscribe to a coordinated application set (e.g., 206, 226) that provides functionalities of a variety of applications to the users under one umbrella. The coordinated application set, executed by a first server (e.g., 244, 248), may be a productivity suite and include applications such as an email/calendar application 212, 232, a word-processing application 210, 230, a spreadsheet application, a notebook application 214, 234, or a presentation application 208, 228 that upon execution may enable the users to communicate, create, edit, and share content. For example, a first user 202 may execute the presentation application 208 on a first client device 204, such as a smart phone, and/or a second user 222 may execute the presentation application 228 on a second client device 224, such as a tablet, respectively. Other client devices may include a desktop computer, a laptop, and a wearable, for example. The first user 202 and the second user 222 may communicate and/or share the content with one another over a network such as a cloud 242 through one or more available communication modes. The communication modes may include voice communication, audio communication, video communication, email messaging, instant messaging, application sharing, and/or data sharing, for example. Additionally, the coordinated application set (e.g., 206, 226) may include a communication application (e.g., 216, 236) executed by a second server (e.g., 246, 250) that is an integrated module of the coordinated application set. The communication application may include a selection module (e.g., 218, 238) and a communication module (e.g., 220, 240). In some examples, the first server and the second server may be managed by separate entities that communicate via application programming interfaces (APIs).

In an example embodiment, the first user 202, an initiating user, may request to initiate a communication session with the second user 222, a target user, through the presentation application 208. For example, the first user 202 may request to send a presentation document to the second user 222 through the presentation application 208. The selection module 218 of the communication application 216 may be configured to detect the request to initiate the communication session from within the presentation application 208, and determine available communication modes. The available communication modes may be determined based on the first user 202 and/or second user 222 and/or based on the network over which the first user 202 and/or second user 222 are communicating.

The selection module 218 may be configured to remove unused communication modes based on one or more removal criteria. The removal criteria may include lack of subscription to a service that provides the communication mode and a lack of login or lack of recent login to a subscription account using the communication mode by one or both of the first user 202 and second user 222. For example, if the first user 202 and/or the second user 222 have not subscribed to a service or logged into a subscription account using an instant messaging communication mode, the instant messaging communication mode may be removed.

The selection module 218 may then be configured to prioritize remaining available communication modes to select a communication mode based on one or more priority criteria, where the selected communication mode may be video communication, for example. The priority criteria may include frequent use of the communication mode by the first user 202 and/or the second user 222, and definition of the communication mode as the selected communication mode by the first user 202 and/or the second user 222. The priority criteria may also include a location and availability status of the first user 202 and/or the second user 222, current use of the communication mode, and capabilities of a device currently being used by the first user 202 and/or the second user 222.

In some embodiments, a confidence level in the prioritization of the remaining available communication modes may be determined based on a ratio of priority criteria that correspond to a highest prioritized communication mode, where a first and second threshold may be defined. In response to a determination that the confidence level is above a first threshold, a highest prioritized communication mode may be automatically selected as the selected communication mode. In response to a determination that the confidence level is below the first threshold and above a second threshold, a highest prioritized communication mode may be automatically selected with an option provided to the first user 202 and/or the second user 222 to change the selected communication mode. In response to a determination that the confidence level is below the second threshold, a list of the prioritized communication modes may be presented to the first user 202 and/or the second user 222 for selection of the communication mode.

Furthermore, the communication mode may be selected based on a type of content to be shared between the first user 202 and the second user 222. For example, for the document from the presentation application 208 that the first user 202 is sharing with the second user 222, video communication may be selected as the communication mode such that the document may be visually displayed for presentation to the second user 222.

The communication module 220 of the communication application 216 may then be configured to initiate the communication session between the first user 202 and the second user 222 through the selected communication mode.

Figure 3:
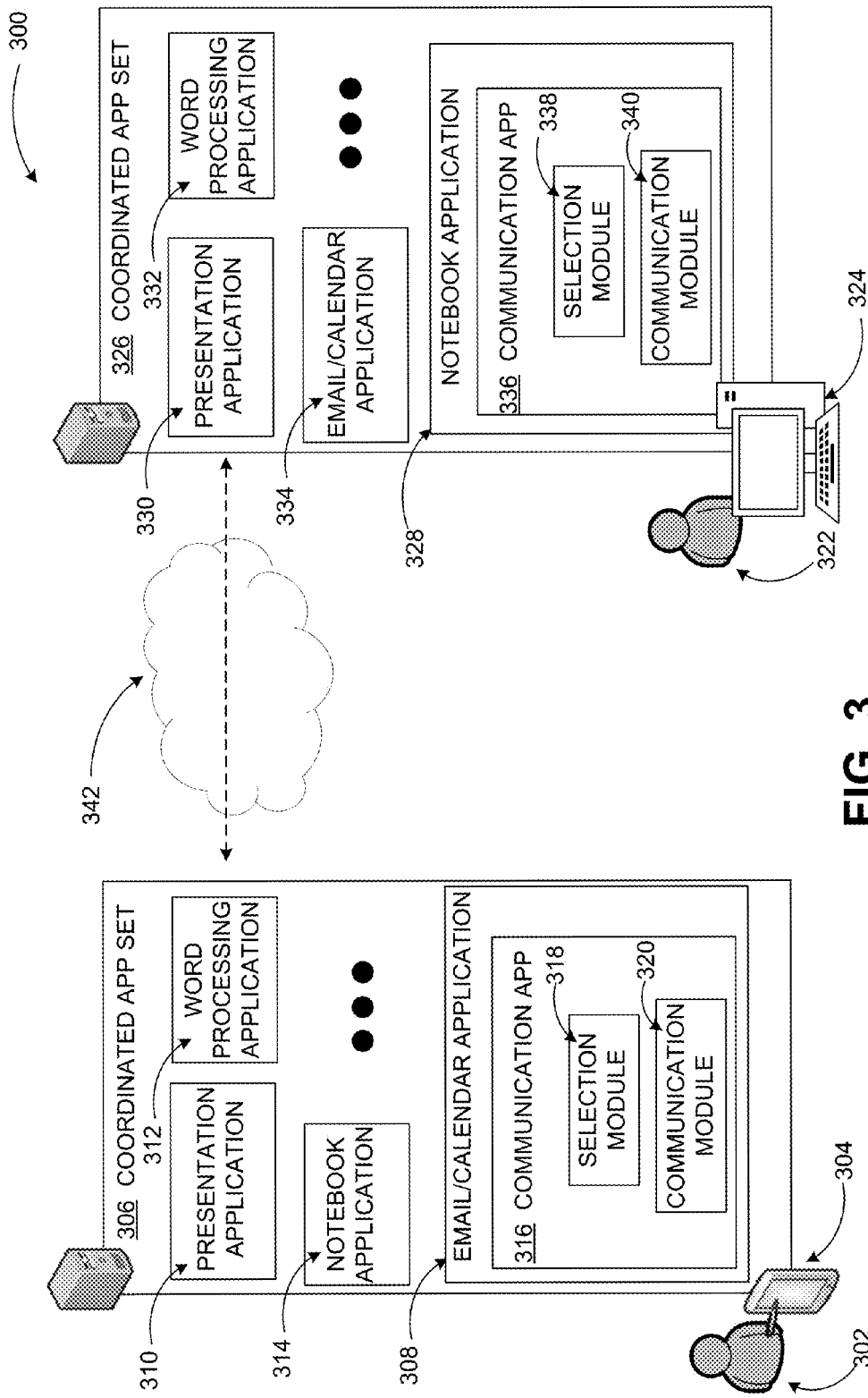
FIG. 3 illustrates a conceptual diagram illustrating an example networked configuration environment, where a communication application may be an integrated module of an application.

FIG. 3 illustrates a conceptual diagram illustrating an example networked configuration environment, where a communication application may be an integrated module of an application. One or more users (e.g., 302, 322) may subscribe to a coordinated application set (e.g., 306, 326). The coordinated application set may provide the users access to one or more applications such as an email/calendar application 308, 334, a word-processing application 312, 332, a spreadsheet application, a notebook application 314, 328, or a presentation application 310, 330 that upon execution may enable the users to communicate, create, edit, and share content. For example, a first user 302 may execute the email/calendar application 308 on a first client device 304, such as a tablet, and/or a second user 322 may execute the notebook application 328 on a second client device 324, such as a desktop computer, respectively. Other client devices may include a laptop, a smart phone, and a wearable, for example. The first user 302 and the second user 322 may communicate and/or share the content with one another over a network such as a cloud 342 through one or more available communication modes. The available communication modes may include voice communication, audio communication, video communication, email messaging, instant messaging, application sharing, and/or data sharing, for example. Additionally, one or more of the applications (e.g., the email/calendar application 308 associated with the first user 302, and the notebook application 328 associated with the second user 322) may include a communication application (e.g., 316, 336) that is an integrated module of the applications, and includes a selection module (e.g., 318, 338) and a communication module (e.g., 320, 340).

In an example embodiment, the first user 302, an initiating user, may request to initiate a communication session with the second user 322, a target user, through the email/ calendar application 308. For example, the first user 302 may request to send a brief, text-based message to the second user 322 through the email/calendar application 308. The selection module 318 may be configured to detect the request to initiate the communication session from within the email/calendar application 308, and determine available communication modes. In other examples, the selection module 318 of the communication application 316 may be configured to detect the request to initiate the communication session from a user experience provided by the communication application 316.

The selection module 318 may be configured to remove unused communication modes based one or more removal criteria. The removal criteria may include lack of subscription to a service that provides the communication mode and a lack of login or lack of recent login to a subscription account using the communication mode by one or both of the first user 302 and second user 322. For example, if the first user 302 and/or the second user 322 have not subscribed to a service or logged into a subscription account using an audio communication mode, the audio communication mode may be removed.

The selection module 318 may then be configured to prioritize remaining available communication modes to select a communication mode based on one or more priority criteria, where the selected communication mode may be instant messaging, for example. The priority criteria may include frequent use of the communication mode by the first user 302 and/or the second user 322, and definition of the communication mode as the selected communication mode by the first user 302 and/or the second user 322. The priority criteria may also include a location and availability status of the first user 302 and/or the second user 322, current use of the communication mode, and capabilities of a device currently being used by the first user 302 and/or the second user 322.

In some embodiments, a confidence level in the prioritization of the remaining available communication modes may be determined based on a ratio of priority criteria that correspond to a highest prioritized communication mode, where a first and a second threshold may be defined. In response to a determination that the confidence level is above a first threshold, a highest prioritized communication mode may be automatically selected as the selected communication mode. In some examples, an option may also be provided to the first user 302 and/or the second user 322 to change the selected communication mode in response to a determination that the confidence level is below the first threshold and above a second threshold. In response to a determination that the confidence level is below the second threshold, a list of the prioritized communication modes may be presented to the first user 302 and/or the second user 322 for selection of the communication mode.

Furthermore, the communication mode may be selected based on a type of content to be shared between the first user 302 and the second user 322. For example, for the brief, text-based message that the first user 302 is sharing with the second user 322, instant messaging or text messing may be selected as the communication mode as the message does not include large amounts of data that may difficult to send via these communications.

The communication module 320 of the communication application 316 may then be configured to initiate the communication session between the first user 302 and the second user 322 through the selected communication mode.

Figure 4:
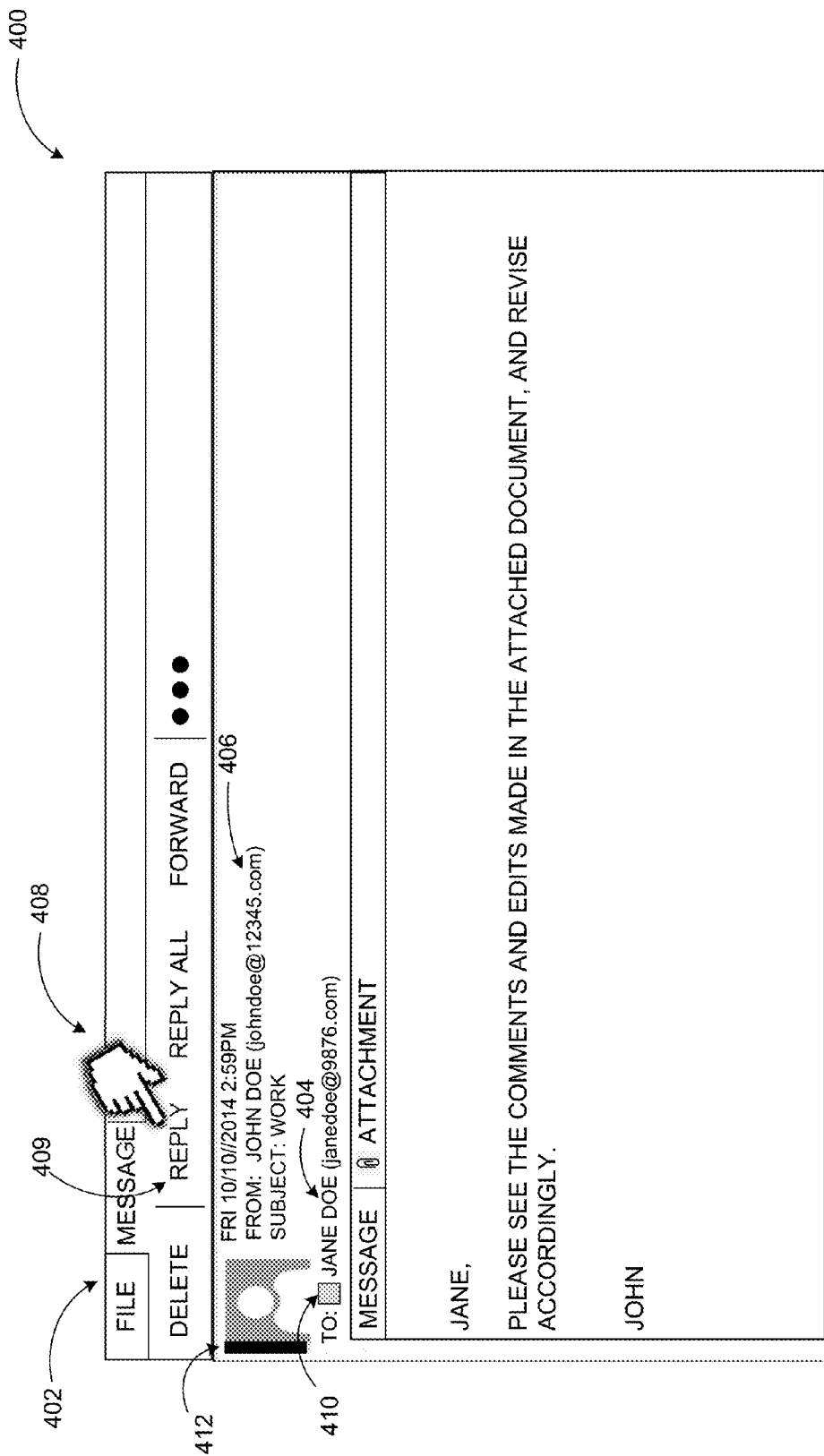
FIG. 4 illustrates an example scenario where a communication application may provide a relevant communication mode selection.

FIG. 4 illustrates an example scenario where a communication application may provide a relevant communication mode selection. As illustrated in diagram 400, an initiating user 404 may request to initiate a communication session with a target user 406, through an email/calendar application 402. For example, the initiating user 404 may request, through a user action 408, to send a reply message to the target user 406 through the email/calendar application 402. The user action 408 may actuate a "reply" control element 409, through touch input, as illustrated, gesture input, voice command, eye tracking, gyroscopic input, pen input, mouse input, and/or keyboard input.

The initiating user 404 and/or the target user 406 may subscribe to a communication application, which may be a third party service or an integrated module of another service such as a coordinated application set or an application. A selection module of the communication application may be configured to detect the request to initiate the communication session from within the email/calendar application 402, and determine available communication modes. Available communication modes may include voice communication, audio communication, video communication, email messaging, instant messaging, application sharing, and data sharing. The available communication modes may be determined based on one or both of the initiating user 404 and the target user 406, and/or a network over which the initiating user 404 and the target user 406 are communicating.

The selection module may be configured to remove unused communication modes. An unused communication mode may be identified for removal by determining whether the initiating user 404 and the target user 406 have subscribed to a service that provides the communication mode and whether the initiating user 404 and the target user 406 have logged into a subscription account using the communication mode. If the initiating user 404 and the target user 406 have not subscribed to a service or logged into a subscription account using the communication mode, the communication mode may be removed.

The selection module may then be configured to prioritize remaining available communication modes to select a communication mode, where the selected mode may be email messaging, for example. In some embodiments, a communication mode may be prioritized if the communication mode is used frequently by one or both of the initiating user 404 and the target user 406 and/or is used frequently by the initiating user 404 when communicating with the target user 406. For example, the initiating user 404 and the target user 406 may both frequently use email messaging communication modes when communicating with other users and with each other. In other embodiments, a communication mode may be prioritized if the communication mode has been explicitly defined as a selected communication mode by one or both of the initiating user 404 and the target user 406. For example, the target user 406 may explicitly define email messaging as a selected communication mode.

In some examples, a communication mode may be prioritized based on one or more of a location and an availability status 410, 412 of one or both of the initiating user 404 and the target user 406. For example, the availability status 412 of the target user 406 may indicate the target user 406 is in a meeting and unavailable, and accordingly the communication mode prioritized may include email messaging. In other examples, a communication mode may be prioritized that one or both of the initiating user 404 and the target user 406 are currently using and/or based on capabilities of a current device used by one or both of the initiating user 404 and the target user 406. For example, the initiating user 404 may be currently using an email messaging mode through the email/calendar application 402 on a smart phone. Accordingly, email messaging may be prioritized.

In some embodiments, a confidence level in the prioritization of the remaining available communication modes may be determined based on a ratio of priority criteria that correspond to a highest prioritized communication mode, where a first and second threshold may be defined. For example, the first threshold may be 80% confidence in prioritization of the remaining available communication modes, and the second threshold may be 40% confidence in prioritization of the remaining available communication modes.

In this scenario, the confidence level may be 100% confidence in prioritization of the remaining available communication modes, where the 100% represents all priority criteria corresponding to a highest prioritized highest prioritized communication mode, the email messaging communication mode. Accordingly, the confidence level may be above the first threshold. In response to a determination that the confidence level is above the first threshold, the highest prioritized communication mode, email messaging, may be automatically selected as the selected communication mode.

Furthermore, the communication mode may be selected based on a type of content to be shared between the initiating user 404 and the target user 406. For example, the reply message that the initiating user 404 is communicating with the second user the target user 406 may include one or more attachments, and thus email messaging may be selected as the communication mode because the documents may be too large to share via text messaging or instant messaging communication modes. A communication module of the communication application may then be configured to initiate the communication session between the initiating user 404 and the target user 406 through the selected communication mode, email messaging.

FIGS. 5A-5D illustrate an example scenario where a communication application may present an option to change a selected communication mode or may present a list of prioritized communication modes to a user for selection of a communication mode.

As shown in diagram 500A, an initiating user may create a document 504 through a presentation application 502, where the presentation application 502 may be executed on a client device, such as a tablet. A user experience of the presentation application 502 may preview one or more slides 505 of the document 504 adjacent to a current slide of the document 504 being displayed. The initiating user may perform a user action 508, which may include touch input, gesture input, voice command, eye tracking, gyroscopic input, pen input, mouse input, and/or keyboard input, to select a communication control element 506. The communication control element 506 may be located on the user experience of the presentation application 502, and selection of the communication control element 506 may indicate that the initiating user is requesting to initiate a communication session with a target user to share the document 504.

Figure 5A:
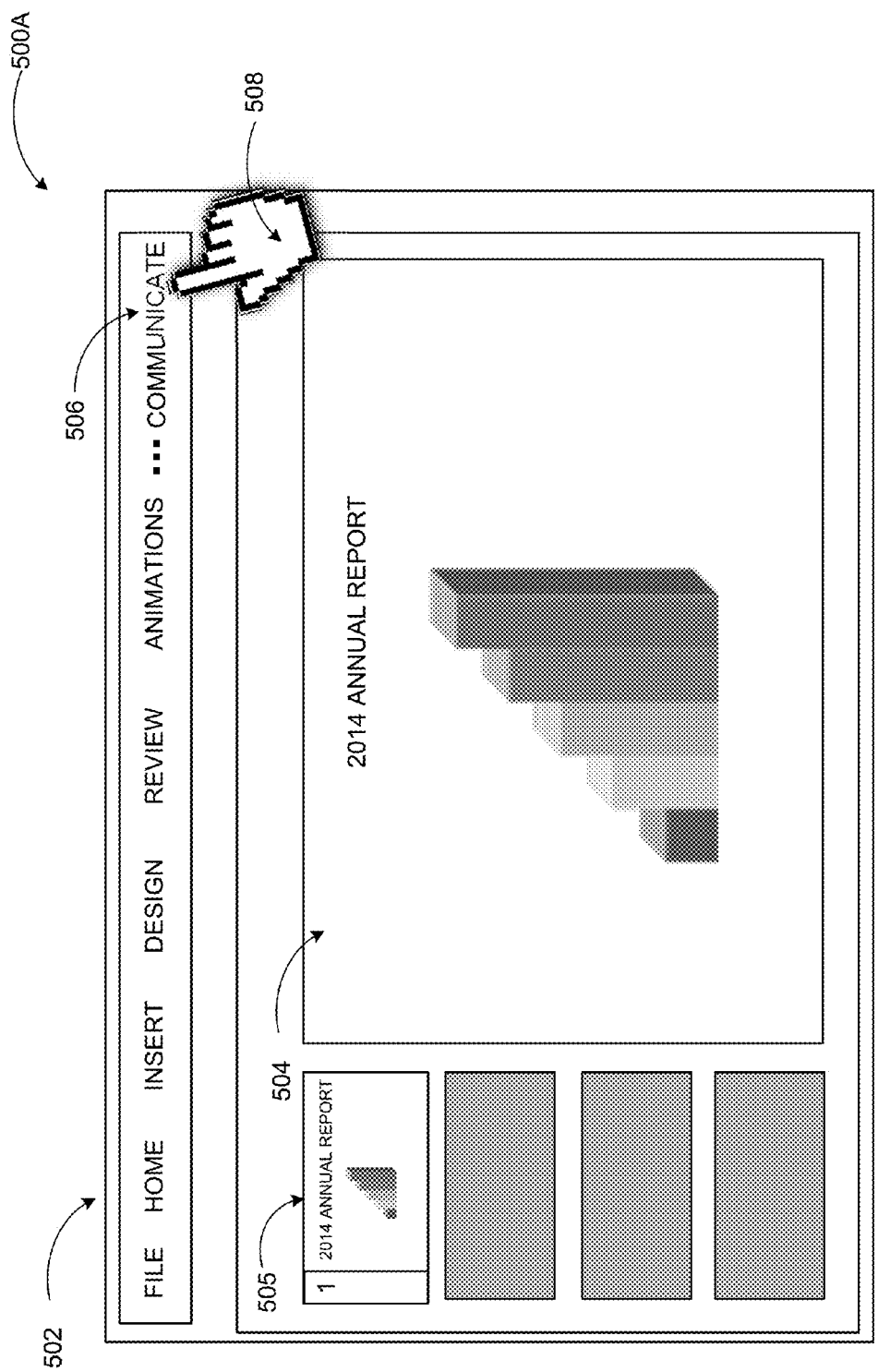
FIGS. 5A-5D illustrate an example scenario where a communication application may present an option to change a selected communication mode or may present a list of prioritized communication modes to a user for selection of a communication mode.
Figure 5B:
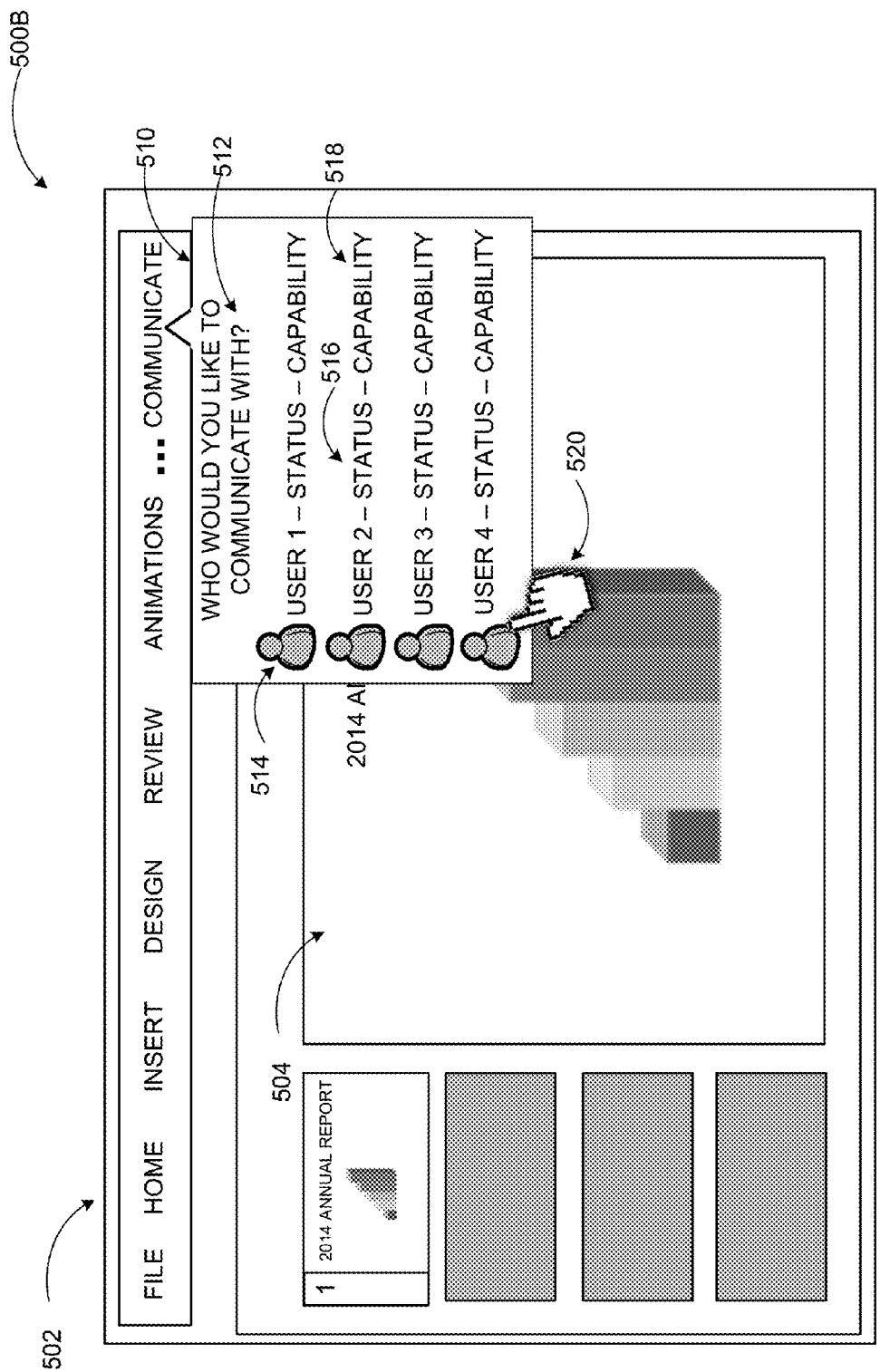

In response to selection of the communication control element 506, a display element 510 may be presented to the initiating user, as shown in diagram 500B of FIG. 5B. The display element 510 may include a text-based prompt 512, such as "Who would you like to communicate with?", and present a list of one or more users 514 that may be selected as a target user. In some embodiments, the display element 510 may be a preview pane of an application that further includes a status 516 and a device capability 518 associated with each user presented in the list users 514. The preview pane may enable a user experience of the application to be visually displayed to the initiating user without having to switch the user experience to the user experience of the application, for example. The initiating user may perform a user action 520 to select the target user. For example, the initiating user may select User 4 as the target user, as illustrated.

In response to selection of the target user, a selection module of a communication application may be configured to determine available communication modes. The available communication modes may be determined based on one or both of the initiating and the target user and/or based on the network over which the initiating and the target user are communicating. The available communication modes may include voice communication, audio communication, video communication, email messaging, instant messaging, application sharing, and/or data sharing, for example. The selection module may also be configured to remove one or more unused communication modes. An unused communication mode may be identified for removal by determining whether the initiating user and the target user have subscribed to a service that provides the communication mode and whether the initiating user and the target user have logged into a subscription account using the communication mode ever and/or recently.

The selection module may then be configured to prioritize remaining available communication modes to select a communication mode based on one or more priority criteria. The priority criteria may include frequent use of the communication mode by the initiating user and/or the target user, and definition of the communication mode as the selected communication mode by the initiating user and/or the target user. The priority criteria may also include a location and availability status of the initiating user and/or the target user, current use of the communication mode by the initiating user and/or the target user, and capabilities of a device currently being used by the initiating user and/or the target user. Furthermore, the communication mode may be selected based on a type of content to be shared between the initiating user and the target user.

A confidence level in the prioritization of the remaining available communication modes may be determined based on a ratio of priority criteria that correspond to a highest prioritized communication mode, where a first and second threshold may be defined. For example, a first threshold may be 65% confidence in prioritization of the remaining available communication modes, where at least 65% of the priority criteria correspond to a highest prioritized highest prioritized communication mode. A second confidence level threshold may be 35% confidence in prioritization of the remaining available communication modes, where at least 35% of the priority criteria correspond to the highest prioritized highest prioritized communication mode.

In response to a determination that the confidence level is above the first threshold, the highest prioritized communication mode may be automatically selected as the selected communication mode. In response to a determination that the confidence level is below the first threshold and above the second threshold, the highest prioritized communication mode may be automatically selected as the selected communication mode and an option may be provided to the imitating user to change the selected communication mode as illustrated in configuration 522 in diagram 500C of FIG. 5C. For example, in the configuration 522, a display element 524 may be displayed through the user experience of the presentation application 502 in response to a determination that the confidence level is below the first threshold and above the second threshold. The display element 524 may be a dialog box, for example, that includes a text-based prompt 526, such as, "The selected communication mode is video communication. Would you like to change the communication mode?" and presents options 528 of "yes" or "no" to the initiating user for changing the selected communication mode. The initiating user may perform a user action 530 to select no, and a communication module may be configured to initiate the communication session between the initiating user and the target user using the video communication mode. In other examples, the initiating user may select yes to change the selected communication mode.

Figure 5C:
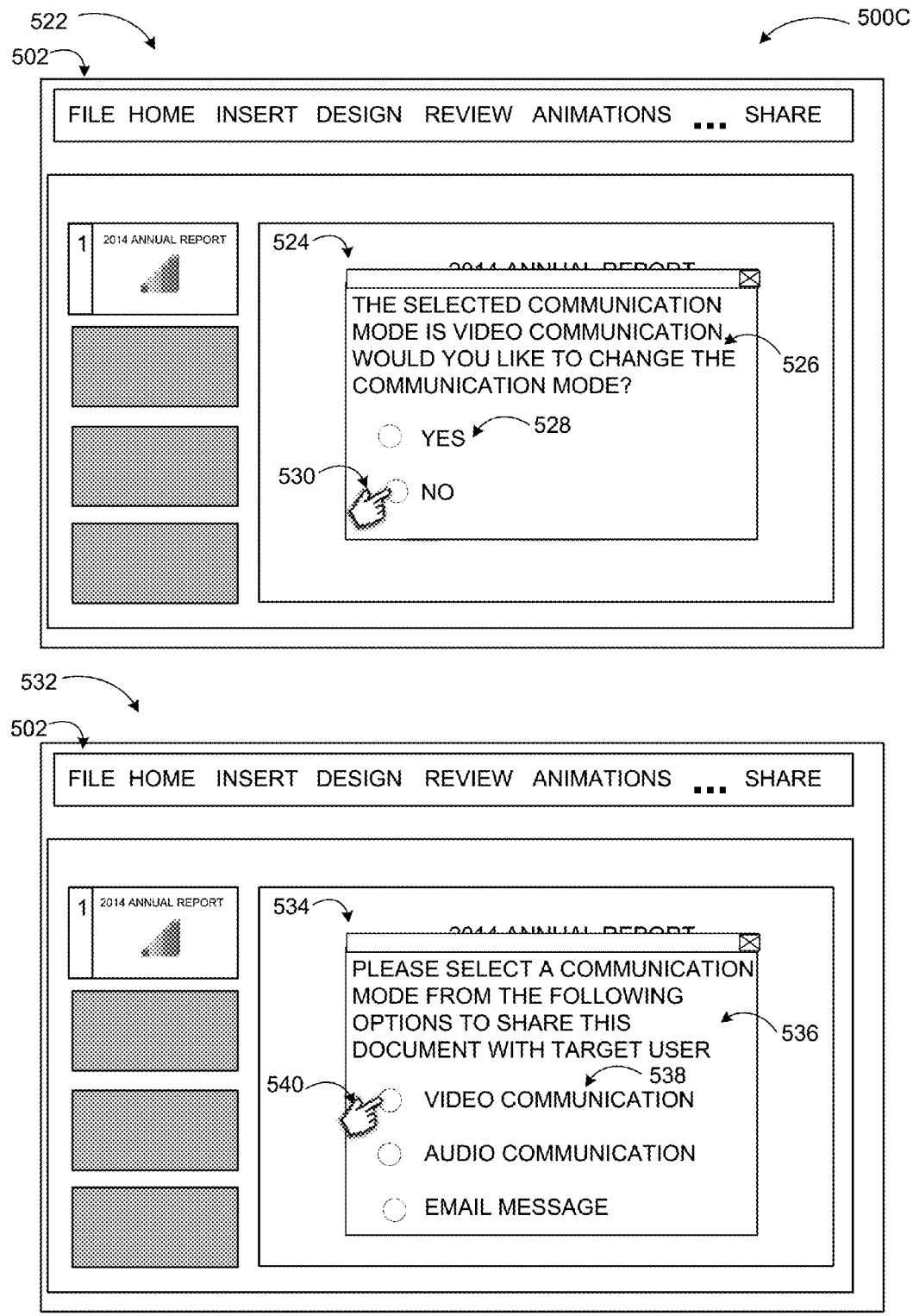

In response to the initiating user selecting yes to change the selected communication mode, or in response to a determination that the confidence level is below the second threshold, a list of the prioritized communication modes 538 may be presented to an initiating user for selection of the communication mode, as further illustrated in configuration 532 in diagram 500C of FIG. 5C. For example, in the configuration 532, a display element 534 may be displayed through the user experience of the presentation application 502. The display element 534 may be a dialog box, for example, that includes a text-based prompt 536, such as, "Please select a communication mode from the following options to share this document with the target user," and presents the list of the prioritized communication modes 538 to the initiating user for selection of the communication mode. The initiating user may perform a user action 540, which may select the communication mode, video communication, for example.

Figure 5D:
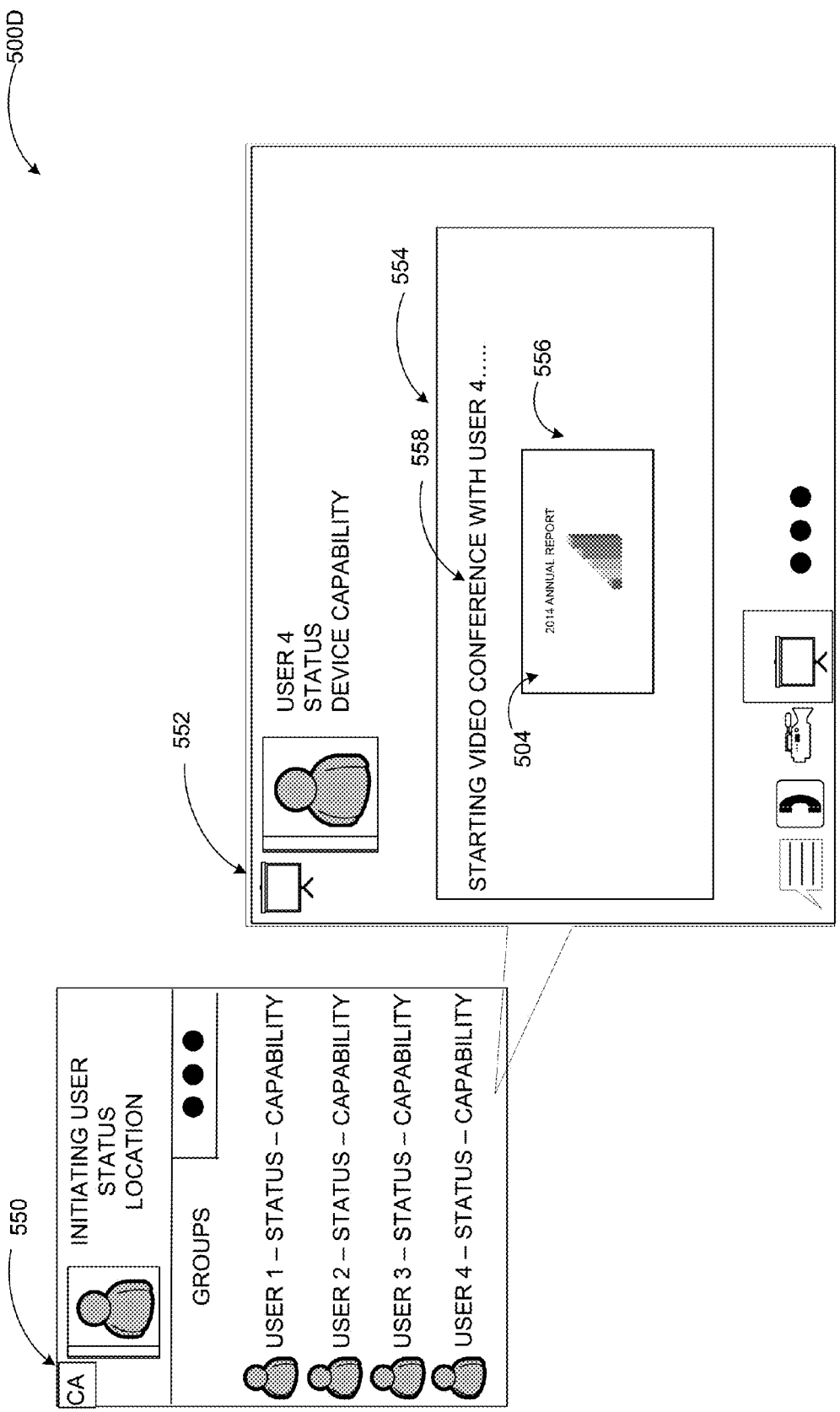

A communication module of the communication application may then automatically initiate the communication session between the initiating user and the target user through the selected communication mode, as illustrated in diagram 500D of FIG. 5D. For example, upon confirmation and/or selection of the video communication mode by the initiating user, the communication module may initiate sharing of the document 504 through a video conferencing feature 552 of a messaging application 550. In some examples, the document 504 may be shared 556 on a display screen 554 of the video conferencing feature 552, and a prompt 558 indicating initiation of the communication session with the target user through the video communication mode may also be included on the display screen 554.

Figure 6:
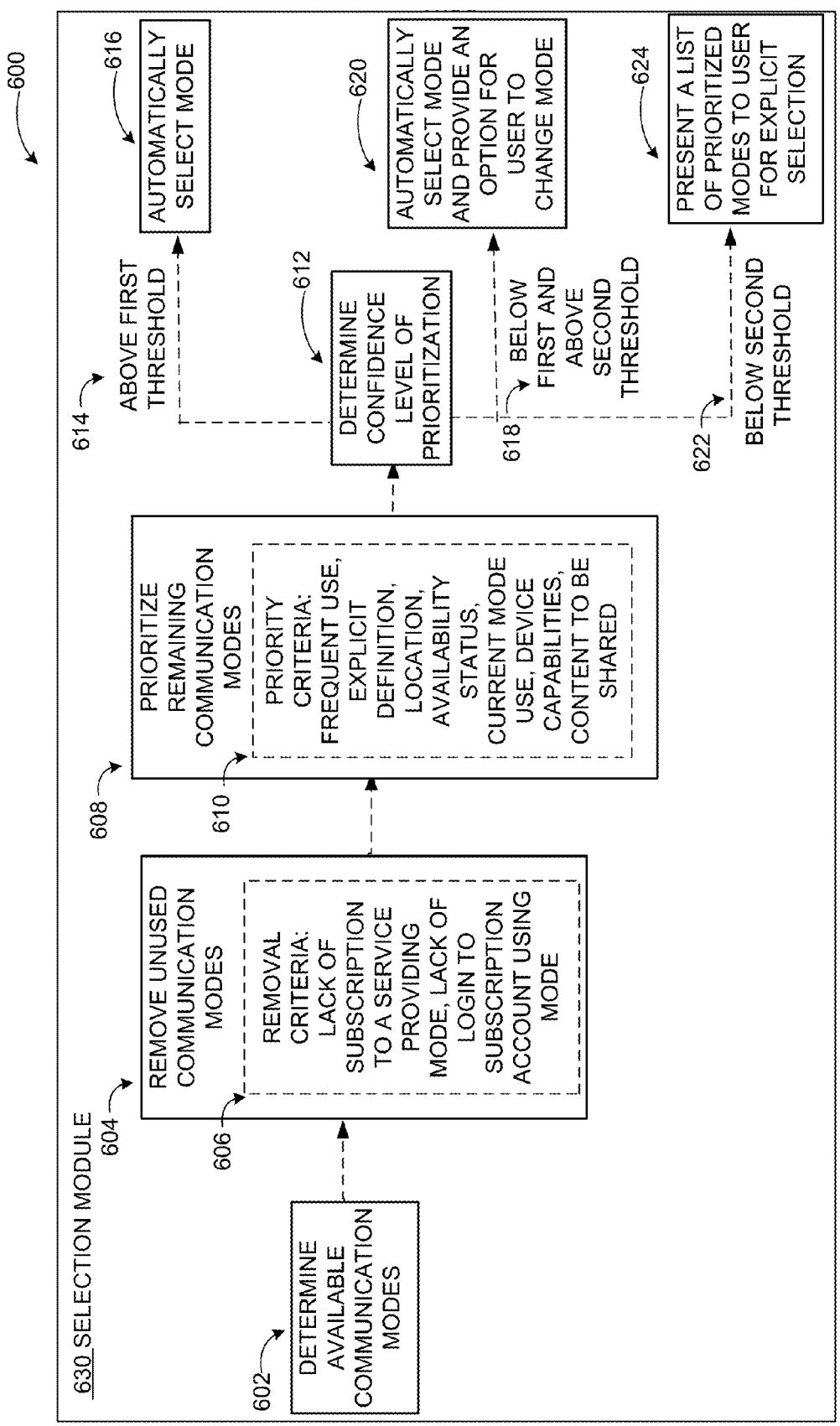
FIG. 6 illustrates an example process to provide a relevant communication mode selection.

FIG. 6 illustrates an example process to provide a relevant communication mode selection. As illustrated in diagram 600, a selection module 630 of a communication application may be configured to determine available communication modes 602 in response to detecting a request from an initiating user to initiate a communication session with a target user. The available communication modes may include voice communication, audio communication, video communication, email messaging, instant messaging, application sharing, and/or data sharing, for example.

The selection module 630 may also be configured to remove unused communication modes 604 based on one or more removal criteria 606. An unused communication mode may be identified for removal by determining whether the initiating user and the target user have subscribed to a service that provides the communication mode and whether the initiating user and the target user have logged into a subscription account using the communication mode. Accordingly, the removal criteria 606 may include a lack of subscription to a service that provides the communication mode and a lack of login or lack of recent login to a subscription account using the communication mode by one or both of the initiating and target users.

The selection module 630 may be further configured to prioritize remaining communication modes 608 based on one or more priority criteria 610 to select a communication mode. The priority criteria 610 may include frequent use of the communication mode by the initiating user and/or the target user, and definition of the communication mode as the selected communication mode by the initiating user and/or the target user. The priority criteria 610 may also include a location and availability status of the initiating user and/or the target user, current use of the communication mode by the initiating user and/or the target user, and capabilities of a device currently being used by the initiating user and/or the target user. Furthermore, the communication mode may be selected based on a type of content to be shared between the initiating user and the target user.

In some embodiments, a confidence level in the prioritization of the remaining communication modes may be determined 612. In response to a determination that the confidence level is above a first threshold 614, a highest prioritized communication mode may be automatically selected as the selected communication mode 616. In response to a determination that the confidence level is below a first threshold and above a second threshold 618, the highest prioritized communication mode may be automatically selected as the selected communication mode, and an option may be provided to the initiating user and/or the target user to change the selected communication mode 620. In response to a determination that the confidence level is below the second threshold 622, a list of the prioritized communication modes may be presented to the initiating user and/or the target user for explicit selection of the communication mode 624.

The examples in FIGS. 1 through 6 have been described using specific network environments, systems, services, applications, and processes to provide a relevant communication mode selection. Embodiments to provide a relevant communication mode selection are not limited to the specific network environments, systems, services, applications, and processes according to these examples.

Automatic selection of a communication mode, as described in the embodiments above, may eliminate unlikely communication modes by removing the unused communication modes by one or both of the initiating user and target user from selection. Furthermore, automatic selection of the communication mode may anticipate future communication mode use between the initiating user and target user by prioritizing the remaining available communication modes to select a communication mode. Accordingly, automatic selection of the communication mode may advantageously improve usability and increase a processing speed by eliminating unlikely communication modes and eliminating additional user selection processing steps.

Figure 7:
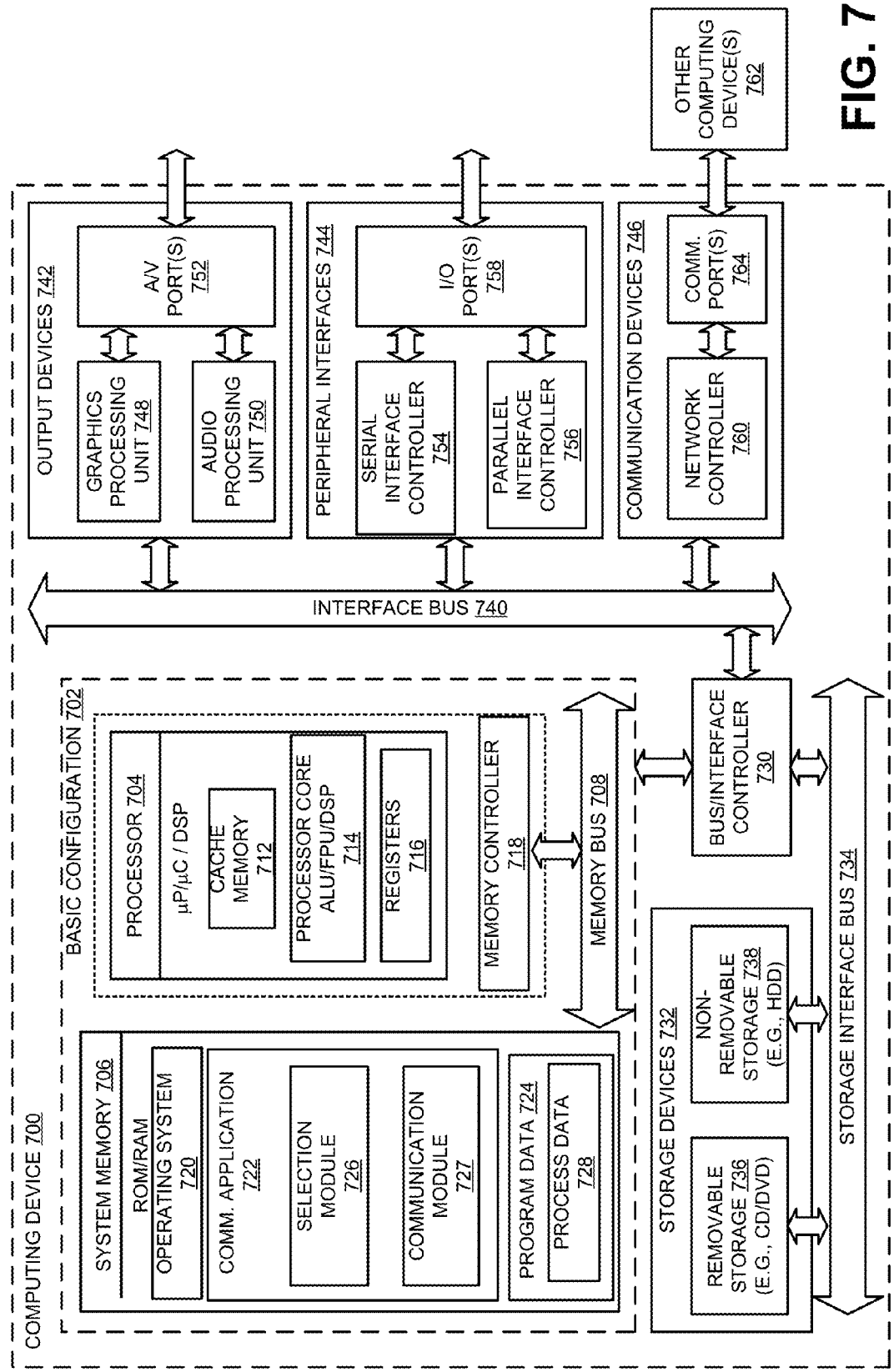
FIG. 7 is a block diagram of an example general purpose computing device, which may be used to provide a relevant communication mode selection.

FIG. 7 and the associated discussion are intended to provide a brief, general description of a general purpose computing device, which may be used to provide a relevant communication mode selection.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (g), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a communication application 722, and program data 724. The communication application 722 may include a selection module 726 and a communication module 727, which may be integrated modules of the communication application 722, or separate applications. The selection module 726 may be configured to determine available communication modes in response to detecting a request to initiate a communication session, remove one or more unused communication modes, and prioritize remaining available communication modes to select a communication mode. The communication module 727 may be configured to automatically initiate the communication session through the selected communication mode. The program data 724 may include, among other data, process data 728 related to removal and priority criteria, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide a relevant communication mode selection. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
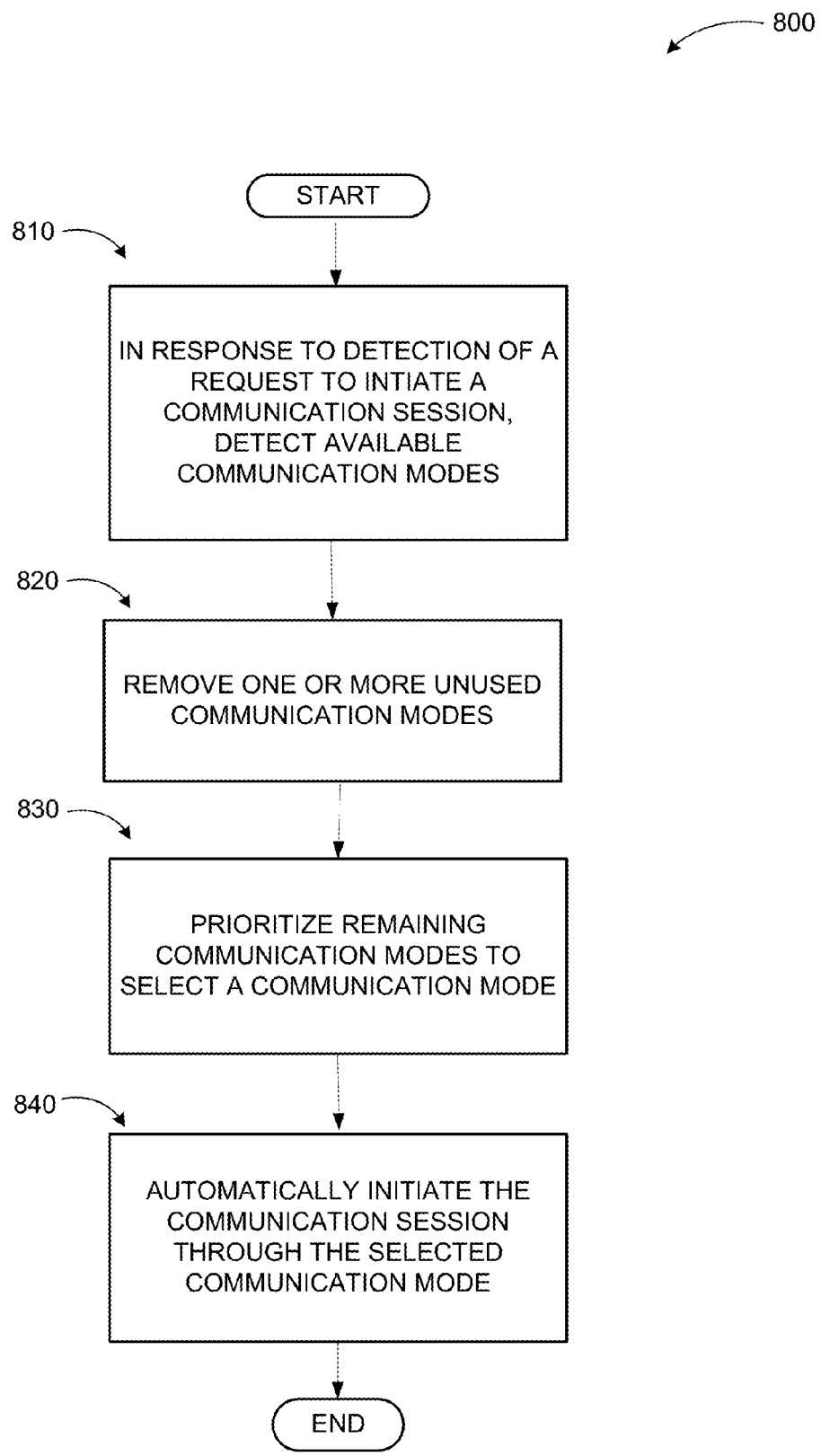
FIG. 8 illustrates a logic flow diagram of a method to provide a relevant communication mode selection, according to embodiments.

FIG. 8 illustrates a logic flow diagram for process 800 of a method to provide a relevant communication mode selection, according to embodiments. Process 800 may be implemented on a server or other system.

Process 800 begins with operation 810, where a selection module of a communication session may be configured to determine available communication modes in response to detecting a request from an initiating user to initiate a communication session with a target user. The available communication modes may be determined based on one or both of the initiating and the target user and/or the network over which the initiating and the target user are communicating. The available communication modes may include voice communication, audio communication, video communication, email messaging, instant messaging, application sharing, and/or data sharing, for example.

At operation 820, the selection module may be configured to remove one or more unused communication modes. An unused communication mode may be identified for removal by determining whether the initiating user and the target user have subscribed to a service that provides the communication mode and whether the initiating user and the target user have logged into a subscription account using the communication mode. For example, if the initiating user and the target user have not subscribed to a service or logged into a subscription account using the communication mode, the communication mode may be removed.

At operation 830, the selection module may prioritize remaining available communication modes to select a communication modes based on one or more priority criteria. The priority criteria may include frequent use of the communication mode by the initiating user and/or the target user, and definition of the communication mode as the selected communication mode by the initiating user and/or the target user. The priority criteria may also include a location and availability status of the initiating user and/or the target user, current use of the communication mode by the initiating user and/or the target user, and capabilities of a device currently being used by the initiating user and/or the target user. Furthermore, the communication mode may be selected based on a type of content to be shared between the initiating user and the target user.

At operation 840, a communication module of the communication application my automatically initiate the communication session between the initiating user and the target user through the selected communication mode.

The operations included in process 800 are for illustration purposes. Automatic selection of a communication mode may be implemented by similar processes with fewer or additional steps, as well as in different order of operations using the principles described herein.

A means to provide relevant communication mode selection may include a means to determine available communication modes in response to detecting a request to initiate a communication session, a means to remove one or more unused communication modes, a means to prioritize remaining available communication modes to select a communication mode, and a means to automatically initiate the communication session through the selected communication mode.

According to some examples, computing devices configured to provide relevant communication mode selection via wireless or wired communication are described. An example computing device may include a memory configured to store instructions, and a processor coupled to the memory and configured to execute a communication application in conjunction with the stored instructions. The communication application may be configured to in response to detection of a request to initiate a communication session through a user interface associated with an application, determine available communication modes, and remove one or more unused communication modes, where an unused communication mode for removal is identified by determining whether an initiating user and a target user subscribed to a service that provides a communication mode and/or whether the initiating user and the target user have logged into a subscription account using the communication mode. The communication application may be further configured to prioritize remaining available communication modes to determine a selected communication mode, where a communication mode that is used frequently by one or both of the initiating user and the target user, and a communication mode that is used frequently by the initiating user when communicating with the target user is prioritized, and automatically initiate the communication session through the selected communication mode.

In other examples, the communication modes may include voice communication, video communication, email messaging, instant messaging, application sharing, and/or data sharing. The communication application may be a third party service or an integrated module of the application. The communication application and the application may be integrated modules of a coordinated application set.

According to some embodiments, methods to provide relevant communication mode selection are provided. An example method may include in response to detecting a request to initiate a communication session, determining available communication modes, and removing one or more unused communication modes. The example method may include prioritizing remaining available communication modes to select a communication mode, and automatically initiating the communication session through the selected communication mode.

In other embodiments, an unused communication mode may be identified for removal by determining whether an initiating user and a target user subscribed to a service that provides a communication mode, and/or whether the initiating user and the target user have logged into a subscription account using the communication mode. A communication mode that is used frequently by one or both of an initiating user and a target user and/or a communication mode that is used frequently by the initiating user when communicating with the target user may be prioritized. A communication mode that one or both of an initiating user and a target user have explicitly defined as a selected communication mode may be prioritized. A communication mode based on one or more of a location and an availability status of one or both of an initiating user and a target user may be prioritized. A communication mode that one or both of an initiating user and a target user are currently using may be prioritized. A communication mode based on capabilities of a device used by one or both of an initiating user and a target user may be prioritized. The communication mode may be selected based on a type of content to be shared between an initiating user and a target user.

In further embodiments, a confidence level in the prioritization of the remaining communication modes may be determined. A highest prioritized communication mode may be automatically selected as the selected communication mode in response to a determination that the confidence level is above a first threshold. An option may be provided to one or both of an initiating user and a target user to change the selected communication mode in response to a determination that the confidence level is below a first threshold and above a second threshold. A list of the prioritized communication modes may be presented to one or both of an initiating user and a target user for selection of the communication mode in response to a determination that the confidence level is below a second threshold.

According to some examples, systems configured to provide relevant communication mode selection may be described. An example system may include a first server configured to provide access to an application to a plurality of users, and a second server configured to execute a communication application. The communication application may be configured to in response to detection of a request to initiate a communication session from within one of the application provided by the first server or a user experience provided by the communication application, determine available communication modes, and remove one or more unused communication modes based on one or more removal criteria. The communication application may be further configured to prioritize remaining available communication modes to determine a selected communication mode based on one or more priority criteria, and automatically initiate the communication session through the selected communication mode.

In other examples, the first server and the second server may be managed by separate entities that communicate via application programming interfaces (APIs). The removal criteria may include lack of a subscription by one or both of an initiating user and a target user to a service that provides a communication mode, and/or lack of login to a subscription account using the communication mode by one or both of the initiating user and the target user. The priority criteria may include frequent use of the communication mode by one or both of an initiating user and a target user, definition of the communication mode as the selected communication mode by one or both of the initiating user and the target user, an availability status of one or both of the initiating user and the target user, current use of the communication mode by one or both of the initiating user and the target user, capabilities of a device currently being used by one or both of the initiating user and the target user, and/or a type of content to be shared between the initiating user and the target user.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device configured to provide relevant communication mode selection via wireless or wired communication, the computing device comprising:
   a memory configured to store instructions;
   a processor coupled to the memory and configured to execute a communication application in conjunction with the stored instructions, the communication application configured to:
   in response to detection of a request to initiate a communication session through a user interface associated with an application, determine available communication modes;
   remove one or more unused communication modes, wherein an unused communication mode for removal is identified by determining at least one of:
     whether an initiating user and a target user subscribed to a service that provides a communication mode; and
     whether the initiating user and the target user have logged into a subscription account using the communication mode;
   prioritize remaining available communication modes to determine a selected communication mode, wherein a communication mode that is used frequently by one or both of the initiating user and the target user, and a communication mode that is used frequently by the initiating user when communicating with the target user is prioritized; and
   automatically initiate the communication session through the selected communication mode.

2. The computing device of claim 1, wherein the communication modes include one or more of: voice communication, video communication, email messaging, instant messaging, application sharing, and data sharing.

3. The computing device of claim 1, wherein the communication application is a third party service or an integrated module of the application.

4. The computing device of claim 1, wherein the communication application and the application are integrated modules of a coordinated application set.

5. A method to provide relevant communication mode selection, the method comprising:
   in response to detecting a request to initiate a communication session, determining available communication modes;
   removing one or more unused communication modes;
   prioritizing remaining available communication modes to select a communication mode; and
   automatically initiating the communication session through the selected communication mode.

6. The method of claim 5, further comprising:
   identifying an unused communication mode for removal by determining at least one of:
   whether an initiating user and a target user subscribed to a service that provides a communication mode; and
   whether the initiating user and the target user have logged into a subscription account using the communication mode.

7. The method of claim 5, wherein prioritizing the remaining communication modes comprises one or more of:
   prioritizing a communication mode that is used frequently by one or both of an initiating user and a target user; and
   prioritizing a communication mode that is used frequently by the initiating user when communicating with the target user.

8. The method of claim 5, wherein prioritizing the remaining communication modes further comprises:
   prioritizing a communication mode that one or both of an initiating user and a target user have explicitly defined as a selected communication mode.

9. The method of claim 5, wherein prioritizing the remaining communication modes further comprises:
   prioritizing a communication mode based on one or more of a location and an availability status of one or both of an initiating user and a target user.

10. The method of claim 5, wherein prioritizing the remaining communication further comprises:
    prioritizing a communication mode that one or both of an initiating user and a target user are currently using.

11. The method of claim 5, wherein prioritizing the remaining communication modes further comprises:
    prioritizing a communication mode based on capabilities of a device used by one or both of an initiating user and a target user.

12. The method of claim 5, further comprising:
    selecting the communication mode based on a type of content to be shared between an initiating user and a target user.

13. The method of claim 5, further comprising:
    determining a confidence level in the prioritization of the remaining communication modes.

14. The method of claim 13, further comprising:
in response to a determination that the confidence level is above a first threshold, automatically selecting a highest prioritized communication mode as the selected communication mode.

15. The method of claim 13, further comprising:
in response to a determination that the confidence level is below a first threshold and above a second threshold, providing an option to one or both of an initiating user and a target user to change the selected communication mode.

16. The method of claim 13, further comprising:
in response to a determination that the confidence level is below a second threshold, presenting a list of the prioritized communication modes to one or both of an initiating user and a target user for selection of the communication mode.

17. A system configured to provide relevant communication mode selection, the system comprising:
a first server configured to provide access to an application to a plurality of users; and
a second server configured to execute a communication application, wherein the communication application is configured to:
in response to detection of a request to initiate a communication session from within one of the application provided by the first server or a user experience provided by the communication application, determine available communication modes;
remove one or more unused communication modes based on one or more removal criteria;
prioritize remaining available communication modes to determine a selected communication mode based on one or more priority criteria; and
automatically initiate the communication session through the selected communication mode.

18. The system of claim 17, wherein the first server and the second server are managed by separate entities that communicate via application programming interfaces (APIs).

19. The system of claim 17, wherein the one or more removal criteria include one or more of:
lack of a subscription by one or both of an initiating user and a target user to a service that provides a communication mode, and lack of login to a subscription account using the communication mode by one or both of the initiating user and the target user.

20. The system of claim 17, wherein the one or more priority criteria include one or more of:
frequent use of the communication mode by one or both of an initiating user and a target user,
definition of the communication mode as the selected communication mode by one or both of the initiating user and the target user,
a location and an availability status of one or both of the initiating user and the target user,
current use of the communication mode by one or both of the initiating user and the target user,
capabilities of a device currently being used by one or both of the initiating user and the target user, and
a type of content to be shared between the initiating user and the target user.

\* \* \* \* \*